(12) United States Patent
Annaamalai

(10) Patent No.: US 11,015,832 B2
(45) Date of Patent: May 25, 2021

(54) THERMOGRAPHIC SENSING OF HUMAN THERMAL CONDITIONS TO IMPROVE THERMAL COMFORT

(71) Applicant: CARRIER CORPORATION, Jupiter, FL (US)

(72) Inventor: Vigneshwaran Annaamalai, Telengana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 184 days.

(21) Appl. No.: 15/918,340

(22) Filed: Mar. 12, 2018

(65) Prior Publication Data
US 2019/0219297 A1 Jul. 18, 2019

(30) Foreign Application Priority Data
Jan. 12, 2018 (IN) .............................. 201811001363

(51) Int. Cl.
F24F 11/65 (2018.01)
F24F 11/56 (2018.01)
(Continued)

(52) U.S. Cl.
CPC .............. *F24F 11/65* (2018.01); *F24F 11/56* (2018.01); *F24F 11/64* (2018.01); *F24F 11/89* (2018.01);
(Continued)

(58) Field of Classification Search
CPC .. F24F 11/65; F24F 11/56; F24F 11/64; F24F 11/89; F24F 2120/14; F24F 2221/00;
(Continued)

(56) References Cited

U.S. PATENT DOCUMENTS

2007/0194909 A1* 8/2007 Garfield ............... G06K 9/0012
340/521
2011/0205366 A1* 8/2011 Enohara .................. F24F 11/30
348/159
(Continued)

FOREIGN PATENT DOCUMENTS

CN 105972765 A 9/2016
WO 2017173222 A1 10/2017

OTHER PUBLICATIONS

Beizee, A, et al., "Assessing the ability of PMV model in predicting thermal sensation in naturally ventilated buildings in UK", Apr. 12-15, 2012, Proceedings of 7th Windor Conference: The changing context of comfort in an unpredictable world, 1-13. (Year: 2012).*
(Continued)

*Primary Examiner* — Mohammad Ali
*Assistant Examiner* — Sheela Rao
(74) *Attorney, Agent, or Firm* — Cantor Colburn LLP

(57) ABSTRACT

A method of managing thermal comfort, the method comprising: capturing a first facial thermal image of a first individual, using a thermal imaging camera; determining a comfort level of the first individual in response to the first facial thermal image; comparing the comfort level determined to a comfort range; determining that the comfort level is not within the comfort range; and operating a heating, ventilation, and air-conditioning (HVAC) system in response to the comfort level and the comfort range.

13 Claims, 3 Drawing Sheets

Figure 1:
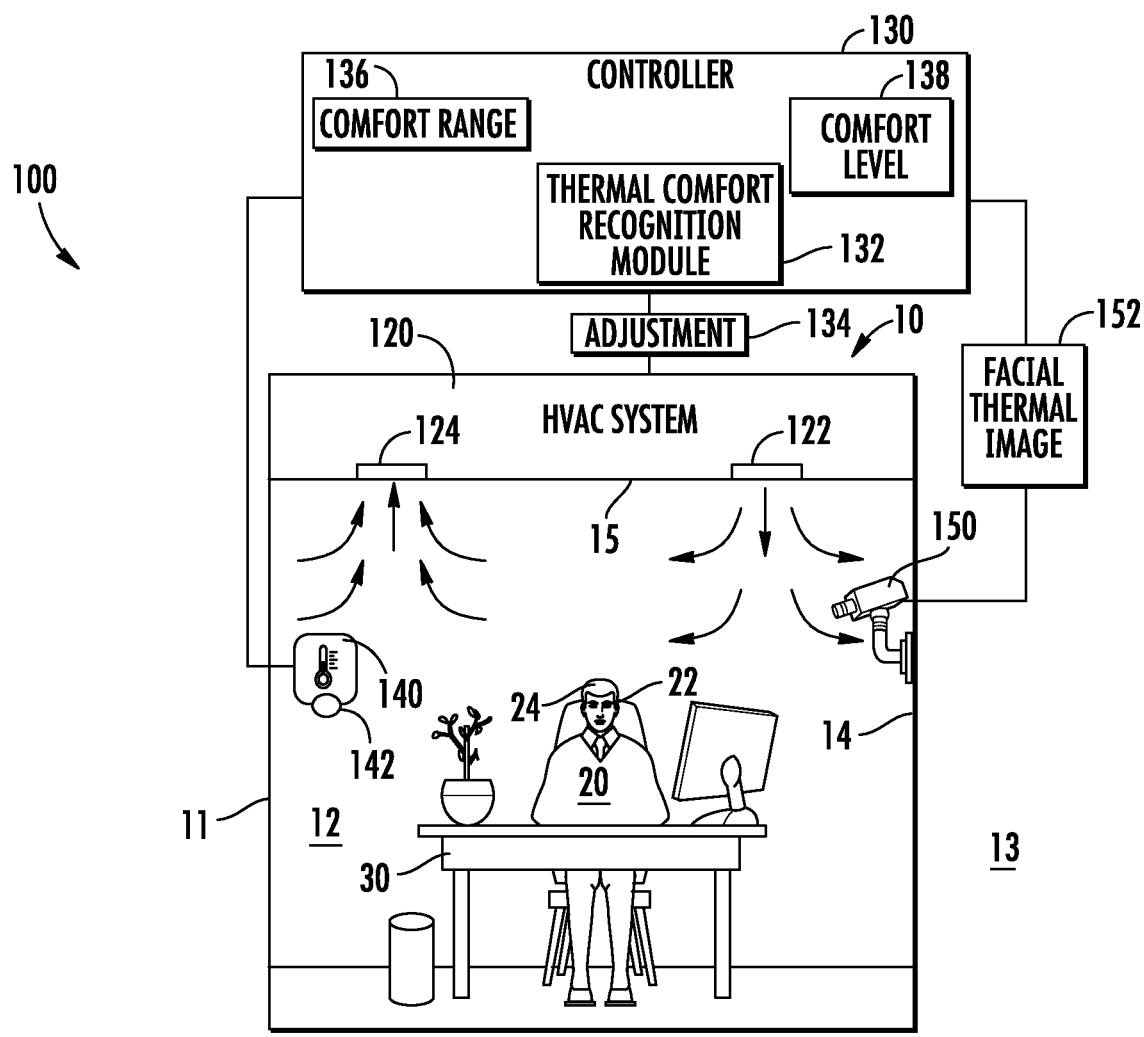

(51) Int. Cl.
*F24F 11/64* (2018.01)
*F24F 11/89* (2018.01)
*G05B 15/02* (2006.01)
*G01J 5/00* (2006.01)
*G01J 5/10* (2006.01)
*F24F 120/12* (2018.01)
*F24F 120/14* (2018.01)

(52) U.S. Cl.
CPC .......... *G05B 15/02* (2013.01); *F24F 2120/12* (2018.01); *F24F 2120/14* (2018.01); *F24F 2221/00* (2013.01); *G01J 5/10* (2013.01); *G01J 2005/0077* (2013.01)

(58) Field of Classification Search
CPC ................. F24F 2120/12; G05B 15/02; G01J 2005/0077; G01J 5/10
See application file for complete search history.

(56) References Cited

U.S. PATENT DOCUMENTS

| | | | |
|---|---|---|---|
| 2014/0148706 A1* | 5/2014 | Van Treeck | A61F 7/0053 600/474 |
| 2015/0028114 A1* | 1/2015 | Rosen | G05D 23/27 236/51 |
| 2015/0204556 A1 | 7/2015 | Kusukame et al. | |
| 2015/0247647 A1* | 9/2015 | Kusukame | F24F 11/30 700/276 |
| 2016/0082808 A1 | 3/2016 | Perkins | |
| 2016/0195856 A1* | 7/2016 | Spero | G05B 15/02 700/90 |
| 2016/0258643 A1 | 9/2016 | Cheatham, III et al. | |
| 2017/0153032 A1 | 6/2017 | Ashgriz et al. | |
| 2017/0229073 A1 | 8/2017 | Ficner et al. | |

OTHER PUBLICATIONS

Guenther, s., "What is PMV? What is PPD? The Basics of Thermal Comfort", Nov. 7, 2019, www.simscale.com. (Year: 2019).*
Sfetzmoher, at al,, Building Simulation 2017, Proceedings of the 15th IBPSA Conference, San Francisco, CA, Aug. 7-9, 2017, pp. 691-700.*
Ali Ghahramania, et al; "Towards Unsupervised Learning of Thermal Comfort using Infrared Thermography" Sonny Astani Dept. of Civil and Environmental Engineering, Viterbi School of Engineering, Univ. of Southern California, KAP 217, 3620 South Vermont Ave., Los Angeles, CA 90089-2531, United States; http://www.sciencedirect.com/science/article/pii/S030626191731601X; Nov. 10, 2017.
Boris Pavlin, et al; "Real-Time Monitoring of Occupants' Thermal Comfort through Infrared Imaging: A Preliminary Study"; http://www.mdpi.com/2075-5309/7/1/10/htm; Buildings; 2017; 1-11 pages.
F. De Oliveira, et al.; "Assessment of Thermal Environment Sensation for Various Climatic Conditions and Fluctuating Air Flow"; EACWE 5; Florence, Italy, Jul. 19-23, 2009; 1-7 pages.
Juhi Ranjan, et al.; "ThermaiSense: Determining Dynamic Thermal Comfort Preferences Using Thermographic Imaging"; https://www.microsoft.com/en-us/research/wp-content/uploads/2016/09/thermalsense-ubicomp-2016.pdf; 2016; 1-11 pages.
Pooya Sharifani et al.; "Direct Measurement of Occupants' Skin Temperature and Human Thermal Comfort Sensation for Building Comfort Control"; Sustainable Human-Building Ecosystems; https://www.researchgate.net/publication/282816417_Direct_Measurement_of_Occupants%27_SkinTemperature_and_Human_Thermal_Comfort_Sensation_for_Building_Comfort_Control; Oct. 2015; 140-149 pages.

* cited by examiner

THERMOGRAPHIC SENSING OF HUMAN THERMAL CONDITIONS TO IMPROVE THERMAL COMFORT

CROSS-REFERENCE TO RELATED APPLICATIONS

This application claims the benefit of Provisional Indian Application No. 201811001363 filed Jan. 12, 2018, which is incorporated herein by reference in its entirety.

BACKGROUND

The subject matter disclosed herein generally relates to the field of heating, ventilation, and air-conditioning (HVAC) systems, and more particularly to an apparatus and method for adjusting HVAC systems.

Human physiological response regulates the heat balance by removing body heat generated by metabolism through various means. Some existing climate control systems employ space sensors at predefined locations in space within the building premises. The actual human thermal comfort perception may not be in line with temperature figures given by these 'fixed location' space sensors. So these space sensors do not reflect the comfort felt by the individuals.

BRIEF SUMMARY

According to one embodiment, method of managing thermal comfort, the method comprising: capturing a first facial thermal image of a first individual, using a thermal imaging camera; determining a comfort level of the first individual in response to the first facial thermal image; comparing the comfort level determined to a comfort range; determining that the comfort level is not within the comfort range; and operating a heating, ventilation, and air-conditioning (HVAC) system in response to the comfort level and the comfort range.

In addition to one or more of the features described above, or as an alternative, further embodiments may include that prior to determining a comfort level of the first individual in response to the first facial thermal image, the method further comprises: transmitting the first facial thermal image to a controller, wherein the controller is configured to determine the comfort level in response to the first facial thermal image.

In addition to one or more of the features described above, or as an alternative, further embodiments may include that prior to the capturing, the method further comprises: operating the thermal imaging camera to visually recognize a face of a first individual.

In addition to one or more of the features described above, or as an alternative, further embodiments may include that prior to the capturing, the method further comprises: operating the thermal imaging camera to visually recognize a region of the face of the first individual.

In addition to one or more of the features described above, or as an alternative, further embodiments may include that operating the HVAC system comprises: operating the HVAC system in at least one of a heating and cooling mode.

According to another embodiment, a thermal comfort control system is provided. The thermal comfort control system comprising: a heating, ventilation, and air-conditioning (HVAC) system configured to control environmental conditions in the interior of the structure; a thermal imaging camera configured to capture a facial thermal image of an individual within the interior of the structure; and a controller in electronic communication with the HVAC system and the thermal imaging camera. The controller comprising: a processor; and a memory comprising computer-executable instructions that, when executed by the processor, cause the processor to perform operations, the operations comprising: receiving the facial thermal image from the thermal imaging camera; determining a comfort level of the individual in response to the facial thermal image captured by the thermal imaging camera; comparing the comfort level determined to a comfort range; determining that the comfort level is not within the comfort range; and operating the HVAC system in response to the comfort level and the comfort range.

In addition to one or more of the features described above, or as an alternative, further embodiments may include that the thermal imaging camera is configured to visually recognize a face of the individual.

In addition to one or more of the features described above, or as an alternative, further embodiments may include that the thermal imaging camera is configured to visually recognize a forehead region of the face of the individual, wherein the first facial thermal image captured is of the forehead region of the individual.

In addition to one or more of the features described above, or as an alternative, further embodiments may include that operating the HVAC system comprises: operating the HVAC system in at least one of a heating and cooling mode.

In addition to one or more of the features described above, or as an alternative, further embodiments may include that the thermal imaging camera is located on at least one of a wall and a ceiling of the interior of the structure.

According to another embodiment, a controller in electronic communication with a heating, ventilation, and air-conditioning (HVAC) system and a thermal imaging camera is provided. The controller comprising: a processor; and a memory comprising computer-executable instructions that, when executed by the processor, cause the processor to perform operations, the operations comprising: receiving a facial thermal image from the thermal imaging camera; determining a comfort level of an individual in response to the facial thermal image; comparing the comfort level determined to a comfort range; determining that the comfort level is not within the comfort range; and operating the HVAC system in response to the comfort level and the comfort range.

In addition to one or more of the features described above, or as an alternative, further embodiments may include that the controller is further configured to: operate the thermal imaging camera to visually recognize a face of the individual.

In addition to one or more of the features described above, or as an alternative, further embodiments may include that the controller is further configured to: operate the thermal imaging camera to visually recognize a region of the face of the individual.

In addition to one or more of the features described above, or as an alternative, further embodiments may include that the controller is further configured to: operate the HVAC system in at least one of a heating and cooling mode.

Technical effects of embodiments of the present disclosure include capturing a thermal image of a face of an individual and adjusting an HVAC system in response to the thermal image.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
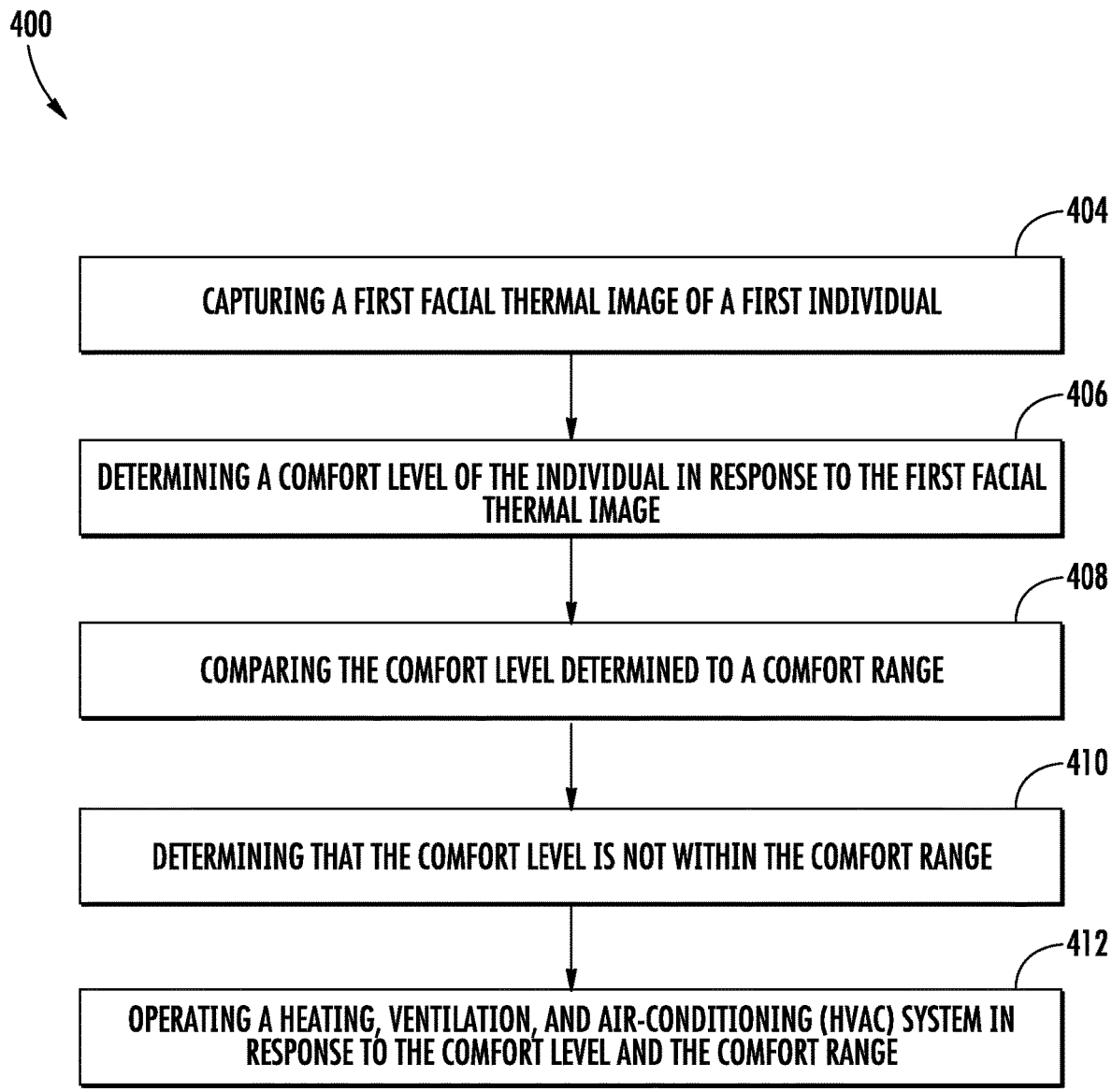
Figure 3:
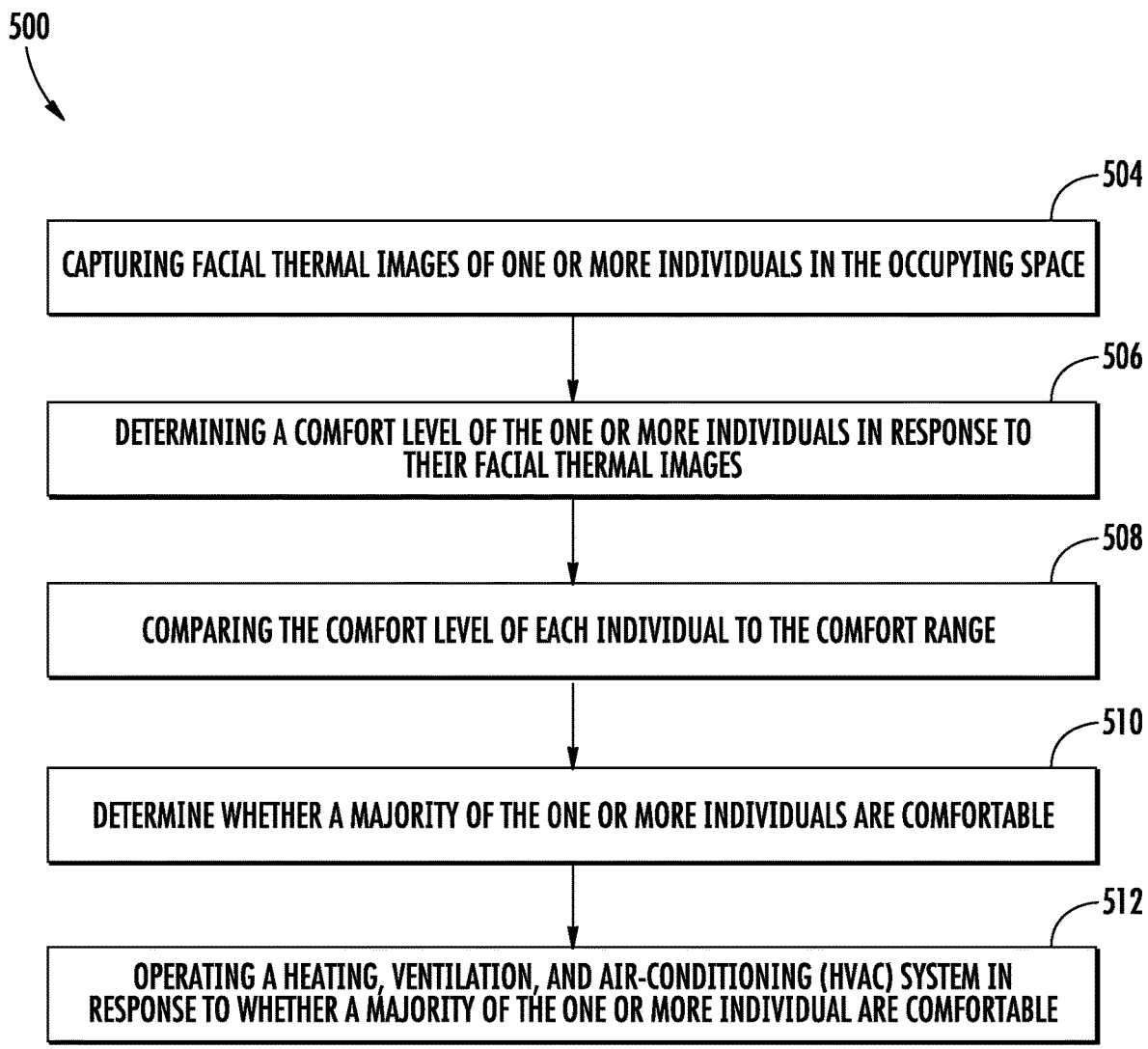

The following descriptions should not be considered limiting in any way. With reference to the accompanying drawings, like elements are numbered alike:

FIG. 1 illustrates a general schematic system diagram of a thermal comfort control system, in accordance with an embodiment of the disclosure; and FIG. 2 is a flow diagram illustrating a method operating a thermal comfort control system for an individual, according to an embodiment of the present disclosure; and FIG. 3 is a flow diagram illustrating a method operating a thermal comfort control system for one or more individuals, according to an embodiment of the present disclosure.

DETAILED DESCRIPTION

A detailed description of one or more embodiments of the disclosed apparatus and method are presented herein by way of exemplification and not limitation with reference to the Figures.

As will be described below, a heating, ventilation, and air-conditioning (HVAC) system for a structure is provided. Human physiological response regulates the heat balance by removing body heat generated by metabolism through various means. Two thirds of radiant heat occurs through the skin present on the forehead and cheeks. Some existing HVAC systems employ space sensors at predefined locations in space within the building premises. The actual human thermal comfort perception may not be in line with temperature figures given by these 'fixed location' space sensors. So these space sensors do not reflect the comfort felt by the individuals. Embodiments disclosed herein relate to controlling various operations of the HVAC system to maintain desired environmental conditions in the interior of the structure using a thermal imaging camera to detect a comfort level of an individual within the interior of the structure by capturing a thermal image of the face of the individual.

With reference to FIG. 1, a thermal comfort control system 100 is illustrated, in accordance with an embodiment of the present disclosure. As seen in FIG. 1, a structure 10 is provided and may be configured as a residence, an industrial building, an office building, a commercial building, a vehicle, a helmet, or a hermetically sealed suit. For purposes of clarity and brevity, however, the following description will relate to the case where the structure 10 is configured as an office building but it is understood that embodiments disclosed herein are not limited to an office building. The structure 10 thus includes a structural body 11 which defines an interior 12 and separates the interior 12 from an exterior 13. The interior 12 may be further divided into multiple rooms and areas for various purposes in the illustrated example of FIG. 1.

The thermal comfort control system 100 includes an HVAC system 120 disposed and configured to control environmental conditions within the interior 12. The HVAC system 120 is configured to condition the air within the interior 12 by means of controlling the volume of heated or cooled air supplied to the interior 12. Some examples of a HVAC system 120 may include but are not limited to a forced air system, a heat pump, a fan, a radiator, a fireplace, a pellet stove, a wood stove, a water mister, or any other device known to one of skill in the art to control thermal comfort. The HVAC system 120 may include a return conduit 124 and a supply 122 to aid in the circulation of air within the interior 12.

The thermal comfort control system 100 also includes a controller 130 configured for controlling thermal comfort of an individual 20 within the interior 12. The controller 130 is in electronic communication with the HVAC system 120 and controls the operations of the HVAC system 120 to provide and maintain a desired thermal environment and thermal comfort level within the interior 12. The electronic communication may be wired and/or wireless. The controller 130 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The thermal comfort control system 100 also includes a system control device 140 (e.g., a thermostat) in electronic communication with the controller 130. The electronic communication between the system control device 140 and the controller 130 may be wired and/or wireless. In a non-limiting embodiment, the system control device 140 may be a mobile application installed on a smart phone. The system control device 140 is generally accessible to an individual 20 and is configured to control various operations of the HVAC system 120 to maintain desired environmental conditions in the interior 12. The system control device 140 may also include a sensor 142 configured to detect environmental conditions in the interior 12, such as, for example, temperature, humidity, pressure, luminous flux, and/or any environmental condition known to one of skill in the art.

The following description will also relate to the cases in which the system control device 140 is wirelessly communicative with the controller 130. This is being done for clarity and brevity and is not intended to otherwise limit the scope of the application as a whole. The system control device 140 may have the capability to establish and maintain wireless connectivity over various networks (e.g., Wi-Fi, Bluetooth, Z-Wave, ZigBee, etc.). The system control device 140 can therefore be connected to a local Wi-Fi network and the Internet. This allows the system control device 140 to have additional features and capabilities including, but not limited to, being remotely controllable by a user using the portable computing device (e.g., a mobile phone, a tablet, a laptop, etc.). The system control device 140 may also have a second private wireless communication link operative along any type of network with the controller 130. In addition, the link between the controller 130 and the system control device 140 could be developed to automatically pair and connect.

The thermal comfort control system 100 also includes a thermal imaging camera 150 in electronic communication with the controller 130. The electronic communication between the thermal imaging camera 150 and the controller 130 may be wired and/or wireless. The thermal imaging camera 150 is configured to visually recognize a face 22 of an individual 20 and capture a facial thermal image 152 of the face 22 of the individual 20. The thermal imaging camera 150 may also be configured to visually recognize the forehead region 24 on the face 22 of the individual 20, and capture a facial thermal image 152 of the forehead region 24 of the individual 20. The thermal imaging camera 150 is positioned in the interior 12 so that they may capture facial thermal images 152. In a first non-limiting example, the thermal imaging camera 150 is located on a wall 14 and/or ceiling 15 of a room to capture facial thermal images 152 of multiple individuals 20 in a single room. There may be multiple thermal imaging camera 150 utilized in the interior. In a second non-limiting example, the thermal imaging camera 150 may be positioned on a desk 30 of an individual 20 to capture a facial thermal image 152 of the individual 20 sitting at the desk 30. In a third non-limiting example, the thermal imaging camera 150 may be positioned in a helmet of an individual to capture facial thermal image 152 of the individual 20 wearing the helmet.

The following description will also relate to the cases in which the thermal imaging camera 150 is wirelessly communicative with the controller 130. This is being done for clarity and brevity and is not intended to otherwise limit the scope of the application as a whole. The thermal imaging camera 150 may have the capability to establish and maintain wireless connectivity over various networks (e.g., Wi-Fi, Bluetooth, Z-Wave, ZigBee, etc.). The thermal imaging camera 150 can therefore be connected to a local Wi-Fi network and the Internet. The thermal imaging camera 150 may also have a second private wireless communication link operative along any type of network with the controller 130. In addition, the link between the controller 130 and the thermal imaging camera 150 could be developed to automatically pair and connect.

The thermal imaging camera 150 is configured to transmit the facial thermal image 152 to the controller 130. The controller 130 includes a thermal comfort recognition module 132 configured to analyze the facial thermal image 152 and determine a comfort level 138 of the individual. If the comfort level 138 is not within a comfort range 136 then the controller 130 will command an adjustment 134 of the HVAC system 120.

For example, the facial thermal image 152 acquired is analyzed by the comfort recognition module 132 to calculate the comfort level 138 felt by the individual 20. The comfort level 138 is the 'Thermal Comfort Vote' (TCV) which is a seven point scale for thermal comfort, from −3 to +3. Value of −3 indicates extreme discomfort in the 'cold sense' and +3 indicates extreme discomfort in the 'warm sense'. A value close to 0 indicates that the person is thermally comfortable, and such a value is the comfort range 136. In a non-limiting example, the thermal comfort range 136 may have a TCV value between −1 and 1. The thermal comfort recognition module 132 correlates the forehead temperature obtained by processing the thermal image 152, to the comfort level 138. The correlation between forehead temperature and comfort level may have been determined from machine learning of a variety of different individuals 20, whose forehead temperatures were studied along while they responded with the thermal comfort felt by them on the seven point TCV scale. This algorithm correlating the forehead temperatures with the comfort level is then embedded in the thermal comfort recognition module 132. The controller 130 may weigh multiple comfort levels 138 determined from facial thermal images 152 of different individuals 20 in order to determine an adjustment 134.

In examples where there are multiple people occupying the interior 12, the thermal comfort recognition module 132 determines the number of people that are comfortable (meaning that each of their comfort levels 138 falls around 0); then, the controller 130 will maintain the current operation of the HVAC system. In situations the thermal comfort recognition module 132 determines that multiple people are uncomfortable, the HVAC system will be adjusted to provide the appropriate conditioning of the interior space 12.

Referring now to FIG. 2 with continued reference to FIG. 1. FIG. 2 shows a flow chart of a method 400 of managing thermal comfort of a first individual in an interior 12 of a structure 10, in accordance with an embodiment of the disclosure. At block 404, a first facial thermal image 152 of a first individual 20 is captured, using a thermal imaging camera 150. Prior to capturing the first facial thermal image 152 the thermal imaging camera 150 may visually recognize a face 22 of a first individual 20. The thermal imaging camera 150 may further visually recognize a forehead region 24 of the face 22 of the first individual 20 and the first facial thermal image 152 captured is of the forehead region 24 of the first individual 20. Following block 404, the thermal imaging camera 150 may transmit the first facial thermal image 152 to the controller 130 and the controller 130 may perform the remaining steps (i.e. blocks 406-412) of the method 400. Alternatively, the thermal imaging camera 150 may perform blocks 406-410 of the method 400 and then the controller 130 may perform block 412.

At block 406, a comfort level 138 of the individual 20 is determined in response to the first facial thermal image 152. At block 408, the comfort level 138 determined is compared to a comfort range 136. At block 410, it is determined whether the comfort level 138 is within the comfort range 136. At block 412, operation of an HVAC system 120 is adjusted in response to the comfort level 138 and the comfort range 136. The HVAC system 120 may be adjusted by increasing cooling output of the HVAC system 120 when the comfort level 138 is determined to be greater than the comfort range 136 (i.e. warmer than the comfort range). The HVAC system 120 may be adjusted by increasing heat output of the HVAC system 120 when the comfort level 138 is determined to be less than the comfort range 136 (i.e. colder than the comfort range). At block 410, if it is determined that the comfort level 138 is within the comfort range 136, then the HVAC system 120 will not be adjusted and the HVAC system 120 will maintain its current operation.

While the above description has described the flow process of FIG. 2 in a particular order, it should be appreciated that unless otherwise specifically required in the attached claims that the ordering of the steps may be varied.

Referring now to FIG. 3 with continued reference to FIG. 1. FIG. 3 shows a flow chart of a method 500 of managing thermal comfort of one or more individuals in an interior 12 of a structure 10, in accordance with an embodiment of the disclosure. At block 504, facial thermal images of one or more occupying individuals 20 are captured, using a thermal imaging camera 150. Prior to capturing facial thermal images, the thermal imaging camera 150 may visually recognize the faces 22 of the one or more individuals. The thermal imaging camera 150 may further visually recognize forehead regions 24 of the faces 22 of each of the individuals 20 and the respective facial thermal images 152 captured are of the forehead regions 24 of each of the individuals 20. Following block 504, the thermal imaging camera 150 may transmit the first facial thermal images 152 to the controller 130 and the controller 130 may perform the remaining steps (i.e. blocks 506-512) of the method 500. Alternatively, the thermal imaging camera 150 may perform blocks 506-510 of the method 500 and then the controller 130 may perform block 512.

At block 506, comfort levels 138 of each of the one or more individuals 20 are determined in response to the respective facial thermal images 152. At block 508, the comfort levels 138 determined for each individual are compared to a comfort range 136. At block 510, it is determined whether the comfort levels 138 of majority of the occupants are within the comfort range 136. At block 512, operation of the HVAC system 120 is adjusted so that the comfort of the majority of the one or more individuals is achieved. The HVAC system 120 may be adjusted by increasing cooling output of the HVAC system 120 when the comfort levels 138 of majority of the one or more individuals is determined to be greater than the comfort range 136 (i.e. warmer than the comfort range). The HVAC system 120 may be adjusted by reducing the cooling output of the HVAC system 120 when the comfort level 138 is determined to be less than the comfort range 136 (i.e. colder than the comfort range). At block 510, if it is determined that the comfort levels 138 of majority of the occupants are within the comfort range 136, then the HVAC system 120 will not be adjusted and the HVAC system 120 will maintain its current operation.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of managing thermal comfort, the method comprising:
    visually recognizing a forehead region of an individual using a thermal imaging camera;
    capturing a facial thermal image of the forehead region, using a thermal imaging camera;
    determining a forehead temperature of the individual in response to the facial thermal image of the forehead region;
    determining a comfort level of the individual in response to the forehead temperature of the individual based on a correlation between forehead temperature and comfort level that was determined from machine learning of a variety of different individuals, whose forehead temperatures were studied while the variety of different individuals responded with the thermal comfort felt on a thermal comfort vote that is a point scale;
    comparing the comfort level determined to a comfort range;
    determining that the comfort level is not within the comfort range; and
    operating a heating, ventilation, and air-conditioning (HVAC) system in response to the comfort level and the comfort range.

2. The method of claim 1, wherein prior to determining a comfort level of the individual in response to the forehead temperature of the individual, the method further comprises:
    transmitting the facial thermal image to a controller, wherein the controller is configured to determine the comfort level in response to the forehead temperature of the individual.

3. The method of claim 1, wherein operating the HVAC system comprises:
    operating the HVAC system in at least one of a heating and cooling mode.

4. The method of claim 1, wherein the point scale is centered around a value of 0, the value of 0 indicating that the individual is thermally comfortable.

5. The method of claim 1, wherein the thermal comfort vote is a seven point scale between a value of −3 and a value of 3, a value of 0 indicating that the individual is thermally comfortable.

6. A thermal comfort control system, comprising:
    a heating, ventilation, and air-conditioning (HVAC) system configured to control environmental conditions in the interior of the structure;
    a thermal imaging camera configured to visually recognize a forehead region of an individual and capture a facial thermal image of the forehead region within the interior of the structure; and a controller in electronic communication with the HVAC system and the thermal imaging camera, the controller comprising:
   a processor; and
   a memory comprising computer-executable instructions that, when executed by the processor, cause the processor to perform operations, the operations comprising:
      receiving the facial thermal image of the forehead region from the thermal imaging camera;
      determining a forehead temperature of the individual in response to the facial thermal image of the forehead region;
      determining a comfort level of the individual in response to the forehead temperature of the individual based on a correlation between forehead temperature and comfort level that was determined from machine learning of a variety of different individuals, whose forehead temperatures were studied while the variety of different individuals responded with the thermal comfort felt on a thermal comfort vote that is a point scale;
      comparing the comfort level determined to a comfort range;
      determining that the comfort level is not within the comfort range; and
      operating the HVAC system in response to the comfort level and the comfort range.

7. The thermal comfort control system of claim 6, wherein operating the HVAC system comprises:
   operating the HVAC system in at least one of a heating and cooling mode.

8. The thermal comfort control system of claim 6, wherein:
   the thermal imaging camera is located on at least one of a wall and a ceiling of the interior of the structure.

9. The thermal comfort control system of claim 6, wherein the point scale is centered around a value of 0, the value of 0 indicating that the individual is thermally comfortable.

10. The thermal comfort control system of claim 6, wherein the point scale is a seven point scale between a value of −3 and a value of 3, a value of 0 indicating that the individual is thermally comfortable.

11. A method of managing thermal comfort, the method comprising:
   visually recognizing a forehead region of two or more individuals using a thermal imaging camera;
   capturing a facial thermal image of the forehead region of each of the two or more individuals, using a thermal imaging camera;
   determining a forehead temperature of each of the two or more individuals in response to the facial thermal image of the forehead region of each of the two or more individuals;
   determining a comfort level of each of the two or more individuals in response to the forehead temperature of each of the two or more individuals based on a correlation between forehead temperature and comfort level that was determined from machine learning of a variety of different individuals, whose forehead temperatures were studied while the variety of different individuals responded with the thermal comfort felt on a thermal comfort vote that is a point scale;
   comparing the comfort level of each of the two or more individuals to a comfort range;
   determining that the comfort level of a majority of the two or more individuals are not within the comfort range; and
   operating a heating, ventilation, and air-conditioning (HVAC) system in response to the comfort level of each of the two or more individuals and the comfort range.

12. The method of claim 11, wherein the point scale is centered around a value of 0, the value of 0 indicating that an individual of the two or more individuals is thermally comfortable.

13. The method of claim 11, wherein the point scale is a seven point scale between a value of −3 and a value of 3, a value of 0 indicating that an individual of the two or more individuals is thermally comfortable.

* * * * *